US012811219B2

(12) United States Patent
Huo

(10) Patent No.: US 12,811,219 B2
(45) Date of Patent: Nov. 24, 2026

(54) ENERGY STORAGE DEVICE

(71) Applicant: Hithium Tech HK Limited, Kowloon (HK)

(72) Inventor: Qiqi Huo, Xiamen (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 560 days.

(21) Appl. No.: 18/374,514

(22) Filed: Sep. 28, 2023

(65) Prior Publication Data

US 2024/0170768 A1 May 23, 2024

Related U.S. Application Data

(63) Continuation of application No. PCT/CN2022/141103, filed on Dec. 22, 2022.

(30) Foreign Application Priority Data

Nov. 17, 2022 (CN) ........................ 202211438939.7

(51) Int. Cl.
*H01M 10/658* (2014.01)
*H01M 10/613* (2014.01)
*H01M 10/655* (2014.01)
*H01M 50/204* (2021.01)

(52) U.S. Cl.
CPC ....... *H01M 10/658* (2015.04); *H01M 10/613* (2015.04); *H01M 10/655* (2015.04); *H01M 50/204* (2021.01)

(58) Field of Classification Search
CPC ............. H01M 10/613; H01M 10/655; H01M 10/6556; H01M 10/6557; H01M 10/658; Y02E 60/10
See application file for complete search history.

(56) References Cited

U.S. PATENT DOCUMENTS

| | | | | |
|---|---|---|---|---|
| 10,826,035 B2 * | 11/2020 | Zeng | .................. | H01M 50/264 |
| 11,652,245 B2 * | 5/2023 | Mao | .................. | H01M 10/613 429/72 |
| 11,728,535 B2 * | 8/2023 | Samie | ................ | H01M 10/613 429/120 |

(Continued)

FOREIGN PATENT DOCUMENTS

| | | |
|---|---|---|
| CN | 205900748 U | 1/2017 |
| CN | 207381452 U | 5/2018 |

(Continued)

OTHER PUBLICATIONS

English Translation for DE 10 2020 121 498 (Year: 2021).*

(Continued)

*Primary Examiner* — Seyed Masoud Malekzadeh
(74) *Attorney, Agent, or Firm* — Hodgson Russ LLP

(57) ABSTRACT

An energy storage device is provided in the disclosure. The energy storage device includes a case, multiple battery modules, at least one cooling assembly, and at least one heat insulation support. The multiple battery modules are accommodated in the case. The at least one cooling assembly is arranged between the multiple battery modules. The at least one heat insulation support is fixedly connected to the case. The at least one heat insulation support each defines a fixing groove configured to fix one of the at least one cooling assembly.

9 Claims, 5 Drawing Sheets

(56) References Cited

U.S. PATENT DOCUMENTS

| | | | | |
|---|---|---|---|---|
| 11,799,151 | B1 * | 10/2023 | Arkus | H01M 10/613 |
| 11,923,515 | B2 * | 3/2024 | Fauteux | H01M 10/6555 |
| 11,996,580 | B2 * | 5/2024 | Liang | H01M 50/383 |
| 12,036,877 | B2 * | 7/2024 | Zeng | H01M 50/317 |
| 12,283,677 | B2 * | 4/2025 | Haas | H01M 10/6556 |
| 12,469,899 | B2 * | 11/2025 | Huo | H01M 10/6555 |
| 2018/0183119 | A1 | 6/2018 | Ju et al. | |
| 2019/0393458 | A1 * | 12/2019 | Zeng | H01M 50/291 |
| 2020/0028222 | A1 * | 1/2020 | Mao | H01M 10/613 |
| 2022/0247005 | A1 * | 8/2022 | Cho | H01M 10/658 |
| 2023/0017290 | A1 * | 1/2023 | Samie | H01M 10/613 |
| 2023/0075142 | A1 * | 3/2023 | Edwards | H01M 50/588 |
| 2026/0005332 | A1 * | 1/2026 | Baumgarte | H01M 10/613 |

FOREIGN PATENT DOCUMENTS

| | | | | |
|---|---|---|---|---|
| CN | 208198608 U | | 12/2018 | |
| CN | 208489245 U | | 2/2019 | |
| CN | 208596767 U | | 3/2019 | |
| CN | 110048184 | | 7/2019 | |
| CN | 210984801 U | | 7/2020 | |
| CN | 111564589 A | | 8/2020 | |
| CN | 212571214 U | | 2/2021 | |
| CN | 213752850 U | | 7/2021 | |
| CN | 113871754 A | | 12/2021 | |
| CN | 215771323 U | * | 2/2022 | |
| CN | 216161805 U | | 4/2022 | |
| CN | 216793847 U | | 6/2022 | |
| CN | 217062260 U | | 7/2022 | |
| DE | 102013017027 A1 | | 4/2015 | |
| DE | 102020121498 | | 11/2021 | |
| DE | 102020121498 A1 | * | 11/2021 | H01M 10/6555 |
| JP | 2012164463 A | | 8/2012 | |
| JP | 2018116813 A | | 7/2018 | |
| JP | 2019096387 A | | 6/2019 | |
| JP | 2022152840 A | | 10/2022 | |
| KR | 19990038740 U | | 10/1999 | |
| KR | 20220001988 | | 1/2022 | |
| TW | 202027319 A | | 7/2020 | |
| WO | 2022199618 A1 | | 9/2022 | |

OTHER PUBLICATIONS

Australian Patent Office, Examination Report issued in corresponding Australian Patent Application No. 2022447730, Sep. 6, 2024, 3 pages.

TIPO, Examination Opinions issued in corresponding Taiwanese Patent Application No. 112137316, Jul. 5, 2024, 13 pages.

CNIPA, International Search Report and Written Opinion for International Application No. PCT/CN2022/141103, Jun. 16, 2023, 12 pages.

EPO, Extended European Search Report for EP Application No. 22932489.2, Feb. 14, 2025.

JPO, Decision to Grant a Patent for JP Application No. 2023-560387, Mar. 21, 2025.

INAPI, Search Report for CL Application No. 202303479, Apr. 15, 2025.

CNIPA, Notice of Allowance for corresponding Chinese Patent Application No. 202211438939.7, Nov. 16, 2023, 11 pages.

CIPO, Examination Report for corresponding Canadian Patent Application No. 3,213,907, Nov. 7, 2024, 3 pages.

JPO, Notice of Reasons for Refusal for corresponding Japanese Patent Application No. 2023-560387, Dec. 5, 2024, 8 pages.

* cited by examiner

ENERGY STORAGE DEVICE

CROSS-REFERENCE TO RELATED APPLICATION(S)

This application is a continuation under 35 U.S.C. § 120 of International Patent Application No. PCT/CN2022/141103, filed Dec. 22, 2022, which claims priority under 35 U. S.C. § 119(a) and/or PCT Article 8 to Chinese Patent Application No. 202211438939.7, filed Nov. 17, 2022. The entire disclosures of International Patent Application No. PCT/CN2022/141103 and Chinese Patent Application No. 202211438939.7 are hereby incorporated by reference.

TECHNICAL FIELD

The disclosure relates to the field of battery technology, in particular to an energy storage device.

BACKGROUND

In the related art, multiple battery modules are arranged in an energy storage device, and a cooling assembly may be arranged between adjacent battery modules. With the cooling assembly arranged at a side of the battery modules, the battery modules may be cooled.

However, in order to fix the cooling assembly at a side of the battery modules, an end of the cooling assembly is usually fixed to a side board of a battery module. Therefore, heat transfer may occur between the cooling assembly and the side board, and between the side board and a battery box in contact with the side board, which not only affects the heat dissipation efficiency of the cooling assembly to the battery module, but also leads to inconsistent temperature between cells near the side board and cells in other areas of the battery module, and leads to large temperature difference in the battery module.

SUMMARY

An energy storage device is provided in the disclosure. The energy storage device includes a case, multiple battery modules, at least one cooling assembly, and at least one heat insulation support. Multiple battery modules are accommodated in the case. The at least one cooling assembly is arranged between the multiple battery modules. The at least one heat insulation support is fixedly connected to the case. The at least one heat insulation support each defines a fixing groove configured to fix one of the at least one cooling assembly.

Additional aspects and advantages of the disclosure will be set forth in part in the following description, which will become apparent in the following description or will be understood through the practice of the disclosure.

BRIEF DESCRIPTION OF THE DRAWINGS

The above and/or additional aspects and advantages of the disclosure will become apparent and easy to understand from description of embodiments in conjunction with the following accompany drawings.

EXPLANATION OF REFERENCE SIGNS

Figure 1:
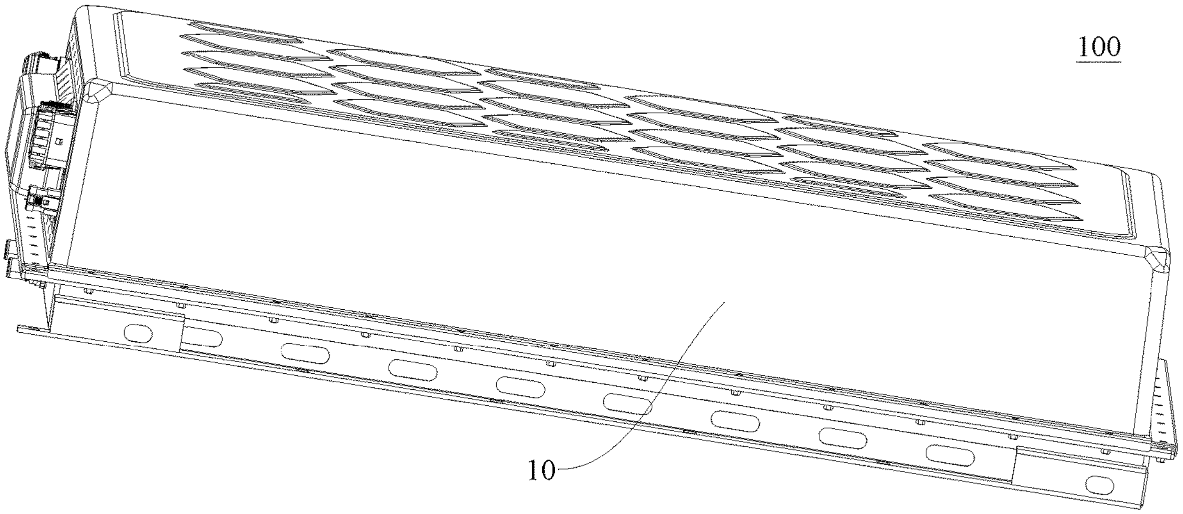
FIG. 1 is a schematic view of an energy storage device provided in embodiments of the disclosure.
Figure 2:
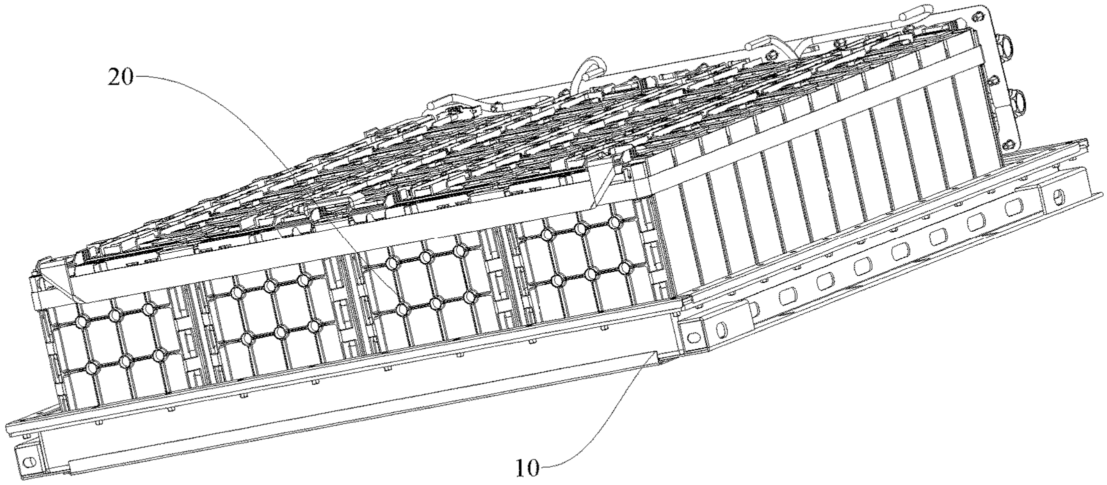
FIG. 2 is a schematic view of an energy storage device provided in other embodiments of the disclosure (with the case being not illustrated).

100—energy storage device; 10—case; 11—baseboard; 111—cross beam; 112—longitudinal beam; 1121—positioning hole; 12—side board; 20—battery module; 30—cooling assembly; 40—heat insulation support; 41—fixing segment; 411—fixing groove; 412—positioning protrusion; 413—chamfer; 42—limiting segment; 421—main part; 422—first reinforcing plate; 423—second reinforcing plate; 43—connecting segment; 50—bus plate; mounting plate 414.

DETAILED DESCRIPTION

The following will describe embodiments of the present disclosure in detail, and examples of embodiments herein will be illustrated in the accompanying drawings, in which the same or similar reference numerals denote the same or similar components or components having the same or similar functions throughout the context. Embodiments described hereinafter with reference to the accompanying drawings are illustrative and intended for explaining, rather than limiting, the present disclosure.

The disclosure aims to solve at least one of the technical problems existing in the related art. The disclosure aims to provide an energy storage device, with more even temperature distribution in a battery module in the energy storage device, and higher cooling efficiency of a cooling assembly in the energy storage device.

In the first aspect of the disclosure, the energy storage device includes a case, multiple battery modules, at least one cooling assembly, and at least one heat insulation support. Multiple battery modules are accommodated in the case. The at least one cooling assembly is arranged between the multiple battery modules. The at least one heat insulation support is fixedly connected to the case. The at least one heat insulation support each defines a fixing groove configured to fix one of the at least one cooling assembly.

According to the energy storage device in embodiments of the disclosure, by arranging the heat insulation support, heat exchange between the cooling assembly and the case may be reduced while the cooling assembly is fixed. On one hand, cooling effect and cooling efficiency of the cooling assembly may be improved. On the other hand, temperature in certain areas of the case will not be too low, and condensation on the case may be avoided. Therefore, the safety is improved, temperature in certain areas of battery modules will be prevented from getting too low, and temperature in multiple battery cells in a single battery module and temperature in multiple battery modules may be more even.

According to some embodiments of the disclosure, the case includes a baseboard and a side board. The baseboard has a cross beam and a longitudinal beam perpendicular to the cross beam. The longitudinal beam is parallel to a length direction of the multiple battery modules, and the cross beam is parallel to a width direction of the multiple battery modules. The baseboard and the side board cooperatively form the case. The at least one heat insulation support is arranged on the cross beam and the longitudinal beam. By increasing fixing stability of the at least one heat insulation support on the case, fixing stability of the at least one cooling assembly on the at least one heat insulation support may be increased. At the same time, the at least one cooling assembly may be separated from the side board, to further reduce heat exchange between the case and the cooling assembly.

According to some embodiments of the disclosure, each of the at least one heat insulation support includes a fixing segment, a limiting segment, and a connecting segment. The fixing segment is located at one side of the cross beam and is fixed to the longitudinal beam. The fixing groove is defined on top of the fixing segment. The limiting segment is located at the other side of the cross beam. Two ends of the connecting segment are connected to the fixing segment and the limiting segment respectively, and the connecting segment is supported by the cross beam.

By arranging the at least one heat insulation support, on one hand, the heat insulation support may serve as a triangular support to increase fixing stability and reliability of the cooling assembly on the case. On the other hand, heat exchange between the side board and the at least one cooling assembly may be reduced, so that cooling effect and cooling efficiency of the cooling assembly may be improved. At the same time, temperature in certain areas of the case will be prevented from getting too low. Therefore, temperature in the battery module is ensured to be even, which avoids large temperature difference in the battery module, and improves working stability and the safety of the energy storage device.

According to some embodiments of the disclosure, the fixing segment has a positioning protrusion at bottom of the fixing segment, the longitudinal beam defines a positioning hole, and the positioning protrusion is inserted into the positioning hole. Fixing stability and reliability of the heat insulation support in the case may be further improved.

According to some embodiments of the disclosure, the fixing groove has openings on one side of the fixing groove away from the connecting segment and on top of the fixing groove, for insertion of a cooling assembly, which makes the installation more convenient.

According to some embodiments of the disclosure, the fixing groove has chamfers at the openings for assembly guidance, further improving installation convenience of the cooling assembly on the insulation support.

According to some embodiments of the disclosure, groove walls of the fixing groove on two sides of the cooling assembly are equal in thickness. Therefore, force distribution on two sides of the heat insulation support in the width direction is more even, which improves fixing stability, and the structural strength and stability of the heat insulation support.

According to embodiments of the disclosure, the limiting segment includes a main part, a first reinforcing plate, and two second reinforcing plates. The main part is located between the cross beam and the side board of the case. Two ends of the main part abut against the cross beam and the side board respectively. The main part is perpendicular to the connecting segment. The first reinforcing plate is arranged on the main part. The first reinforcing plate is connected to the connecting segment and coplanar with the connecting segment. The two second reinforcing plates are arranged on two sides of the first reinforcing plate respectively. The two second reinforcing plates each are perpendicular to the first reinforcing plate. The two reinforcing plates are arranged symmetrically with respect to the first reinforcing plate.

Therefore, the structural strength of the heat insulation support may be improved, stability and reliability of the limiting segment on the baseboard may also be further improved.

According to embodiments of the disclosure, the at least one cooling assembly each has at least one end in the length direction of the battery modules fixed in at least one fixing groove of at least one heat insulation support. Then the at least one cooling assembly may be fixed in the case in a stable and reliable way by the at least one heat insulation support.

According to some embodiments of the disclosure, the energy storage device includes multiple cooling assemblies, each of the multiple cooling assemblies is arranged between two adjacent battery modules. The energy storage device includes multiple heat insulation supports. Each of the multiple cooling assemblies is provided with a heat insulation support on each of two ends of each of the multiple cooling assemblies in the length direction of the multiple battery modules. Two ends of each of the multiple cooling assemblies in the length direction of the multiple battery modules are fixed in fixing grooves of heat insulation supports respectively.

According to some embodiments of the disclosure, the energy storage device includes multiple cooling assemblies. A bus plate is arranged on the same end of the multiple cooling assemblies in the length direction of the battery modules, and the multiple cooling assemblies are connected to one another through the bus plate.

According to some embodiments of the disclosure, the fixing segment, the connecting segment, and the limiting segment are integrally formed.

The following will describe an energy storage device 100 and an electric device provided in embodiments of the disclosure with reference from FIG. 1 to FIG. 8.

As illustrated in FIG. 1, FIG. 2, FIG. 3, FIG. 4, and FIG. 5, the energy storage device 100 provided in the first aspect of embodiments of the disclosure includes a case 10, multiple battery modules 20, at least one cooling assembly 30, and at least one heat insulation support 40.

The multiple battery modules 20 are arranged in the case 10. The multiple battery modules 20 are arranged successively in a width direction of the case 10. The at least one cooling assembly 30 is arranged between the multiple battery modules 20 and each is located at a side of the battery module 20. Two sides of the cooling assembly 30 may cool two adjacent battery modules 20 to increase the cooling efficiency. The at least one heat insulation support 40 is fixedly connected to the case 10. The heat insulation support 40 each defines a fixing groove 411 configured to fix one of the at least one cooling assembly 30. The cooling assembly 30 may be fixed by the heat insulation support 40, thus increasing stability and reliability of the cooling assembly 30 in the case 10. Heat exchange between the case 10 and the cooling assembly 30 may be reduced by the heat insulation support 40, so that heat insulation may be more effective and the loss of cold energy of the cooling assembly 30 may be reduced, which improves cooling efficiency and cooling effect. In addition, temperature in the case 10 will not be too low, which avoids temperature in certain areas of the battery modules 20 from getting lower than other areas, thus achieving better evenness of temperature in the battery modules 20.

According to the energy storage device 100 in embodiments of the disclosure, by arranging the heat insulation support 40, heat exchange between the cooling assembly 30 and the case 10 may be reduced while the cooling assembly 30 is fixed. On one hand, cooling effect and cooling efficiency of the cooling assembly 30 may be improved. On the other hand, temperature in certain areas of the case 10 will be prevented from getting too low, thus avoiding condensation on the case 10. Therefore, not only the safety may be improved, but also temperature in certain areas of battery modules 20 will not be too low, resulting in that temperature in multiple batteries of a single battery module 20 and temperature in multiple battery modules 20 may be more even.

Figure 3:
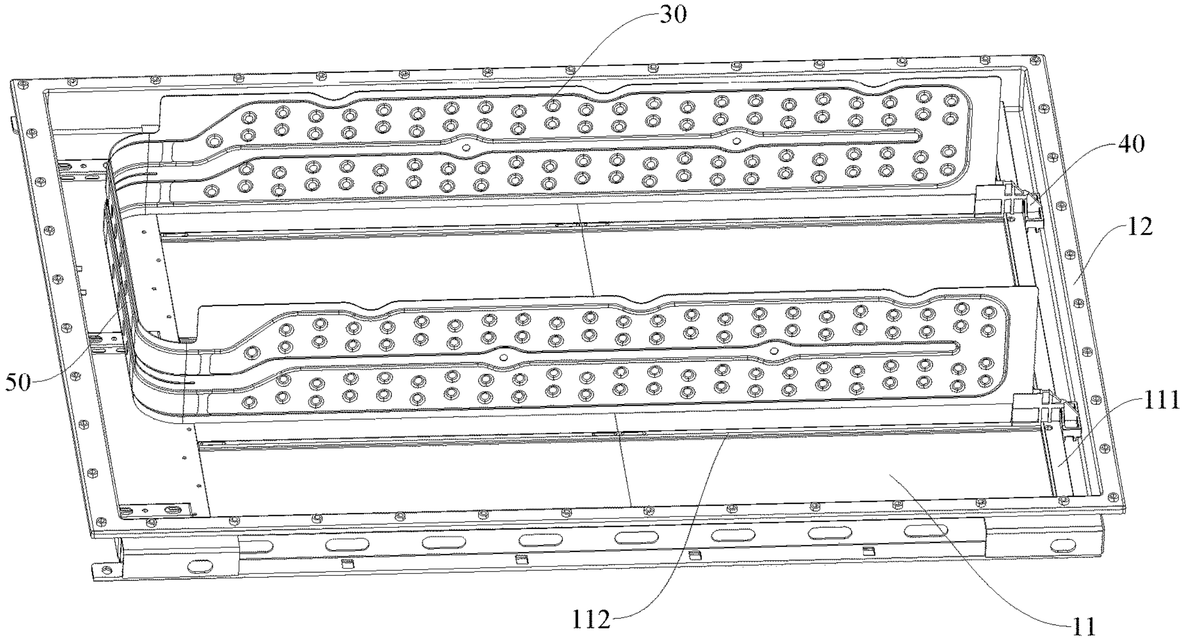
FIG. 3 is a schematic view illustrating cooperation of a cooling assembly and a case of an energy storage device provided in embodiments of the disclosure.
Figure 5:
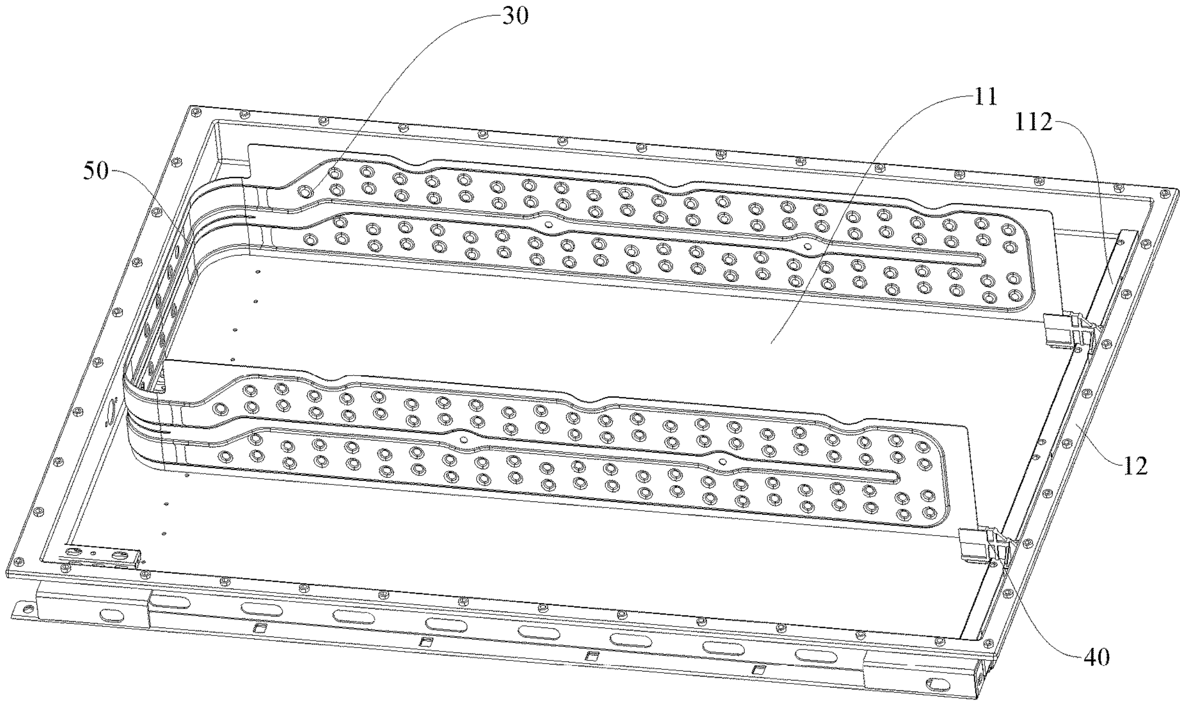
FIG. 5 is a schematic view illustrating cooperation of a heat insulation support, a case, and a cooling assembly of an energy storage device provided in embodiments of the disclosure.
Figure 7:
FIG. 7 is a schematic view of an insulating plate of an energy storage device provided in embodiments of the disclosure.

As illustrated in FIG. 3, FIG. 5, and FIG. 7. The case 10 includes a baseboard 11 and a side board 12. The baseboard 11 has a cross beam 111 and a longitudinal beam 112 perpendicular to the cross beam 111. The longitudinal beam 112 is parallel to a length direction of the battery modules 20, and the cross beam 111 is parallel to a width direction of the battery modules 20. The length direction of the battery modules 20 also refers to the length direction of the case 10. The width direction of the battery modules 20 also refers to the width direction of the case 10. The baseboard 11 and the side board 12 cooperatively form the case 10. The at least one heat insulation support 40 is arranged on the cross beam 111 and the longitudinal beam 112.

Specifically, the longitudinal beam 112 extends in the length direction of the battery modules 20, and the cross beam 111 extends on the width direction of the battery modules 20. The longitudinal beam 112 and the cross beam 111 cooperatively define an accommodating space, and a battery module 20 may be arranged in each accommodating space. The battery modules 20 are fixed to the cross beam 111 and the longitudinal beam 112, and the at least one heat insulation support 40 is disposed on the cross beam 111 and the longitudinal beam 112. Fixing stability of the cooling assembly 30 on the heat insulation support 40 may be improved by improving fixing stability of the heat insulation 40 in the case 10. At the same time, the cooling assembly 30 and the side board 12 may be spaced apart to further reduce heat exchange between the case 10 and the cooling assembly 30.

According to embodiments of the disclosure, the heat insulation support 40 includes a fixing segment 41, a limiting segment 42, and a connecting segment 43. The fixing segment 41 is located at one side of the cross beam 111 and is fixed to the longitudinal beam 112. The fixing groove 411 is defined on top of the fixing segment 41. The limiting segment 42 is located at the other side of the cross beam 111. Two ends of the connecting segment 43 are connected to the fixing segment 41 and the limiting segment 42 respectively, and the connecting segment 43 is supported by the cross beam 111.

Figure 4:
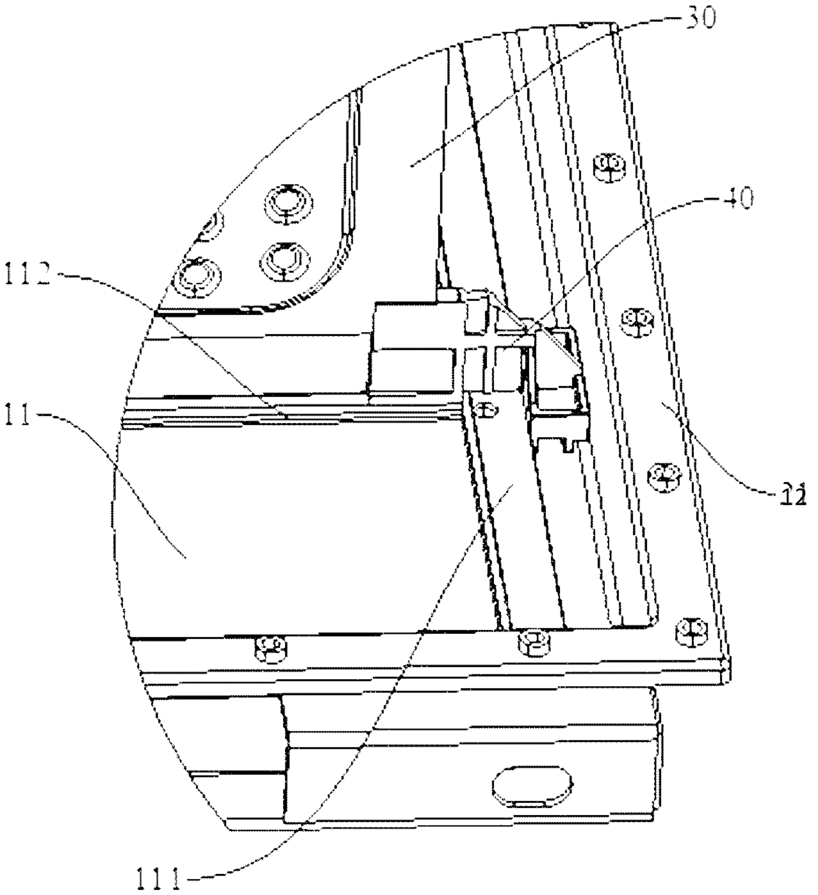
FIG. 4 is a schematic view illustrating cooperation of a heat insulation support, a case, and a cooling assembly of an energy storage device provided in embodiments of the disclosure.
Figure 8:
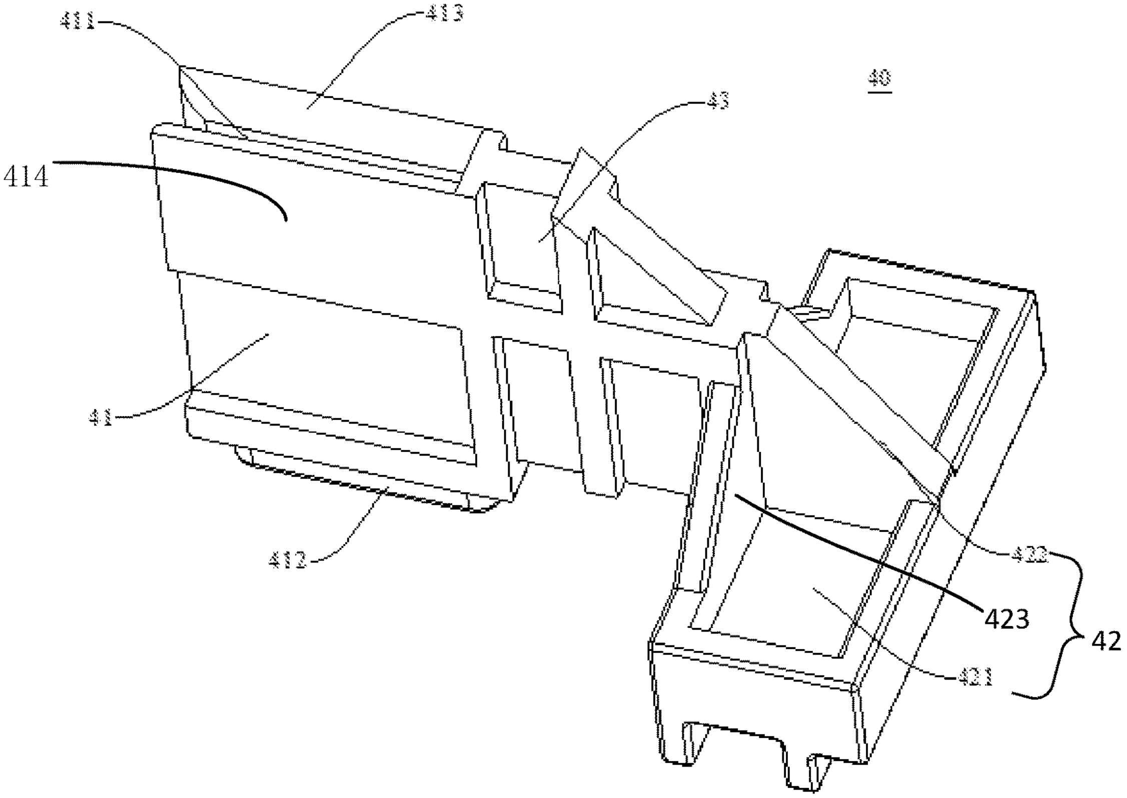
FIG. 8 is a schematic view of a heat insulation support of an energy storage device provided in embodiments of the disclosure.

Specifically, as illustrated in FIG. 4 and FIG. 8, the heat insulation support 40 includes the connecting segment 43, the fixing segment 41, and limiting segment 42. The fixing segment 41 and the limiting segment 42 are located at two ends of the connecting segment 43. The fixing segment 41 extends in the length direction of the case 10. The limiting segment 42 extends in the width direction of the case 10. The fixing segment 41 and the limiting segment 42 each are fixed to the baseboard 11 of the case 10. The fixing segment 42 abuts against the side board 12 of the case 10, separating the side board 12 of the case 10 from the cooling assembly 30.

The projection of the heat insulation support 40 in a height direction may be T-shaped or cross-shaped, then a three-point support or a four-point support for the heat insulation support 40 in the case 10 may be realized by the fixing segment 41 and the limiting segment 42. The fixing stability and reliability of the cooling assembly 30 on the heat insulation support 40 may be improved by improving fixing stability and reliability of the heat insulation 40 in the case 10.

While the limiting segment 42 is fixed on the baseboard 11, at least part of the limiting segment 42 extends to the side board 12 of the case 10 in the length direction of the case 10, and abuts against the side board 12.

As illustrated in FIG. 4 and FIG. 5, the fixing segment 41 is located at one side of the cross beam 111, and the limiting segment 42 is located at the other side of the cross beam 111.

Specifically, the cross beam 111 is arranged on the baseboard 11 and extends in the width direction of the case 10. The cross beam 111 is separated from the side board 12 in the length direction of the case 10. The battery modules 20 are arranged in the case 10, and an end of each of the battery modules 20 is fixed to the cross beam 111 to increase the fixing stability of the battery modules 20 in the case 10. The connecting segment 43 is constructed as a plate, and extends in the length direction of the case 10 to cross the cross beam 111, i.e. facing the cross beam 111 in the height direction of the case 10. The fixing segment 41 and the limiting segment 42 are located at two sides of the cross beam 111. The fixing segment 41 and the limiting segment 42 located at two ends of the cross beam 111 are connected to the baseboard 11. The heat insulation support 40 may be limited by the cross beam 111, so as to avoid the movement of the heat insulating support 40 in the length direction of the case 10, and to improve fixing stability and reliability of the heat insulation support 40 and the cooling assembly 30 in the case 10.

According to the energy storage device 100 provided in embodiments of the disclosure, the heat insulation support 40 is arranged. On one hand, the heat insulation support 40 may serve as a triangular support, so that fixing stability and reliability of the cooling assembly 30 in the case 10 may be increased. On the other hand, heat exchange between the side board 12 and the cooling assembly 30 may be reduced, so that cooling effect and cooling efficiency of the cooling assembly 30 may be improved, and at the same time, temperature in certain areas of the case 10 will not be too low. Therefore, temperature in the battery module 20 is ensured to be even, which avoids large temperature difference in the battery module 20, and improves working stability and the safety of the energy storage device 100.

It may be noted that, the heat insulation support 40 is made of insulating material, which reduces heat exchange between the side board 12 and the cooling assembly 30, and at the same time has better insulation performance to meet the requirement of the electrical protection level of the energy storage device 100.

In embodiments illustrated in FIG. 7 and FIG. 8, the fixing segment 41 has a positioning protrusion 412 at bottom of the fixing segment 41, and the longitudinal beam 112 defines a positioning hole 1121.

An insulating plate may be arranged between the baseboard 11 of the case 10 and the battery modules 20, and the insulating plate has the longitudinal beam 112. The positioning hole 1121 is defined on the insulating plate. Therefore, insulation between the battery modules 20 and the baseboard 11 may be realized, thus improving the safety of the energy storage device 100. The insulating plate is laid on the baseboard 11. The fixing segment 41 may be fixed on the baseboard 11 through the matching between the positioning protrusion 412 and the positioning hole 1121. Through the matching between the positioning protrusion 412 and the positioning hole 1121, not only the heat insulation support 40 is fixed stably on the insulating plate, but also a positioning effect can be achieved, which avoids movement of the heat insulation support 40.

The positioning structure provided in embodiments of the present application is not limited thereto. In other embodiments, a positioning hole 1121 may be defined on a fixing section 41, and a positioning protrusion 412 may be arranged on the insulating plate or the baseboard 11 correspondingly. In order to improve assembly convenience, peripheral side surfaces of the positioning protrusion 412 and/or sidewalls of the positioning hole 1121 each may be a guiding surface extending obliquely, to improve assembly guide during assembly.

Figure 6:
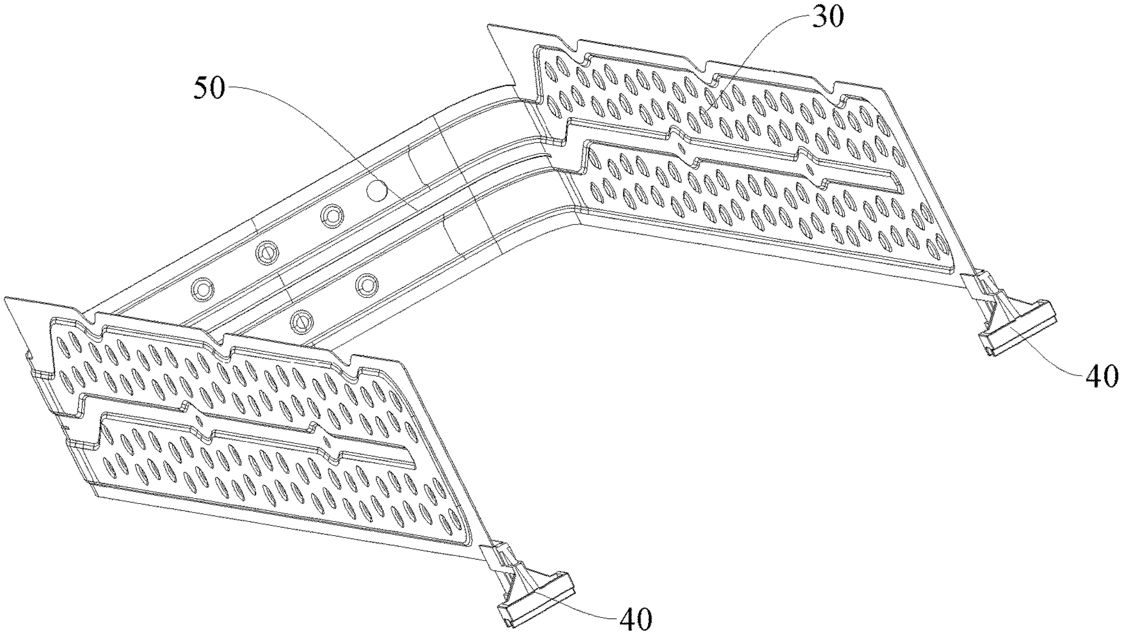
FIG. 6 is a schematic view illustrating cooperation of a heat insulation support and a cooling assembly of an energy storage device provided in embodiments of the disclosure.

As illustrated in FIG. 6 and FIG. 8, in some embodiments, the fixing groove 411 is defined on top of the fixing segment 41, and the fixing groove 411 has openings on one side of the fixing groove 411 away from the connecting segment 43 and on top of the fixing groove 411, for insertion of the cooling assembly 30.

Specifically, two mounting plates 414 are arranged on top of the fixing segment 41, the two mounting plates 414 define the fixing groove 411, and the cooling assembly 30 is installed in the fixing groove 411. By clamping and fixing the cooling assembly 30 at both ends of the cooling assembly 30 with the two mounting plates 414, not only the cooling assembly 30 may be stably fixed, but also the cooling assembly 30 may be vertically arranged in the height direction. Therefore, vertical limiting of the cooling assembly 30 may be realized, so that the cooling effect of the cooling assembly 30 on the battery modules 20 on both sides of the cooling assembly 30 is consistent. Temperature in multiple battery modules 20 may be more even, overheating on certain areas of the battery modules is avoided, and the working stability of the energy storage device 100 is improved.

The two mounting plates 414 each have one end connected to the connecting segment 43, and a free end of one mounting plate 414 is spaced apart from a free end of the other mounting plate 414, so that the top and one side of the fixing groove 411 are open, which makes the installation of the cooling assembly 30 on the heat insulation support 40 more convenient.

It may be understood that, the thickness of the two mounting plates 414 which define the fixing groove 411 is consistent with a distance between two adjacent battery modules 20, so that the gap between two adjacent battery modules 20 may be consistent and reasonable in size. Taking the two mounting plates 414 including the first mounting plate and the second mounting plate as an example, the thickness of the two mounting plates 414 refers to a distance from a surface of the first mounting plate away from the second mounting plate to a surface of the second mounting plate away from the first mounting plate. Then the uniformity of glue-pouring may be ensured, and the thickness of the glue may be more consistent.

Further, the fixing groove 411 has chamfers 413 at the openings to for assembly guiding, which makes the installation of the cooling assembly 30 on the heat insulation support 40 more convenient.

In some embodiments, two side walls of the fixing groove 411 located at both sides of the cooling assembly 30 are equal in thickness, that is, two mounting plates 414 are equal in thickness, so that force distribution on two sides of the heat insulation support 40 in the width direction is more even. Therefore, fixing stability may be improved, and the structural strength and the stability of the heat insulation support 40 may also be improved.

As illustrated in FIG. 8, according to embodiments of the disclosure, the limiting segment 42 includes a main part 421, a first reinforcing plate 422, and two second reinforcing plates 423. The main part 421 is located between the cross beam 111 and the side board 12 of the case 10. Two ends of the main part 421 abut against the cross beam 111 and the side board 12 respectively. The main part 421 is perpendicular to the connecting segment 43. The first reinforcing plate 422 is arranged on the main part 421. The first reinforcing plate is connected to the connecting segment 43 and coplanar with the connecting segment 43. The two second reinforcing plates 423 are arranged on two sides of the first reinforcing plate 422 respectively. The two second reinforcing plates 423 each are perpendicular to the first reinforcing plate 422. The two reinforcing plates 423 are arranged symmetrically with respect to the first reinforcing plate 422.

Specifically, the main part 421 extends in the width direction of the battery modules 20. A strengthening flange may be arranged on an upper side of the main part 421, and a resisting plate extending toward the baseboard 11 may be arranged on a lower side of the main part 421, so that the main part 421 may be arranged between the cross beam 111 and the side board 12. One end of the first reinforcing plate 422 is connected to the connecting segment 43 and extends in the length direction of the battery modules 20. The two second reinforcing plates 423 are located at two sides of the first reinforcing plate 422, and extends in the width direction of the battery modules 20. The structural strength of the heat insulation support 40 may be improved, and the fixing stability and reliability of the limiting segment 42 on the baseboard 11 may be further improved.

It may be noted that, at least one cooling assembly 30 each has at least one end in the length direction of the battery modules 20 fixed in at least one fixing groove 411 of at least one heat insulation support 40. Then the cooling assembly 30 may be stably and reliably fixed in the case 10 by the heat insulation support 40.

Exemplarily, in some embodiments, the energy storage device 100 includes multiple cooling assemblies 30, and each cooling assembly 30 is arranged between two adjacent battery modules 20. The energy storage device 100 includes multiple heat insulation supports 40. Each of the multiple cooling assemblies 30 is provided with the heat insulation support 40 on each of two ends of the cooling assembly 30 in the length direction of the battery modules 20. Two ends the cooling assembly 30 in the length direction of the battery modules 20 are fixed in the fixing grooves 411 of the heat insulation supports 40. In other embodiments, as illustrated in FIG. 3, FIG. 5, and FIG. 6, the energy storage device 100 includes multiple cooling assemblies 30. A bus plate 50 is arranged on the same end of the multiple cooling assemblies 30 in the length direction of the battery modules 20. The multiple cooling assemblies 30 are connected to one another through the bus plate 50.

The multiple cooling assemblies 30 are arranged opposite to each other in the width direction of the battery modules 20. In an embodiment in which the multiple cooling assemblies 30 are arranged independently, heat insulation supports 40 are required at two ends of each cooling assembly 30. In an embodiment in which the multiple cooling assemblies 30 are connected through the bus plate 50 at one end on the same side, each heat insulation support 40 may be arranged only at an end away from the bus plate 50.

It may be understood that, the cooling assembly 30 is arranged between adjacent battery modules 20, and each battery module 20 has one side in contact with the cooling assembly 30. Therefore, the multiple battery modules 20 have similar cooling amount, which makes the temperature in the multiple battery modules 20 more even.

According to embodiments of the disclosure, the fixing segment 41, the connecting segment 43, and the limiting segment 42 are integrally formed, which raises manufacture efficiency of the heat insulation support 40, and reduces manufacture cost of the heat insulation support 40.

It may be understood that directional relationship or positional relationship indicated by terms such as "center", "longitudinal", "lateral", "length", "width", "thickness", "on", "under", "front", "back", "left", "right", "vertical", "horizontal", "top", "bottom", "in", "out", "clockwise", "anticlockwise", "axial", "radial", "circumferential", and the like is directional relationship or positional relationship based on accompanying drawings and are only for the convenience of description and simplicity, rather than explicitly or implicitly indicate that apparatuses or components referred to herein must have a certain direction or be configured or operated in a certain direction, which may not be understood as limitation on the disclosure.

In description of the disclosure, "first feature" and "second feature" may include one or more of the feature.

In description of the disclosure, "multiple" means two of more than two.

In description of the disclosure, a first feature being "on" or "under" a second feature referred to herein may refer to a direct contact between the first feature and the second feature, or an indirect contact between the first feature and the second feature via another feature.

In description of the disclosure, the first feature being "above", "over", and "on" the second feature may be the first feature being right above or obliquely above the second feature, or only refers to the first feature being at a higher horizontal level than the second feature.

The reference term "an embodiment", "some embodiments", "implementation", "specific implementation", or "some implementations" referred to herein means that a particular feature, structure, material, or characteristic described in conjunction with the embodiment or implementation may be contained in at least one embodiment or implementation of the disclosure. The phrase appearing in various places in the specification does not necessarily refer to the same embodiment or implementation. The particular feature, structure, material, or characteristic described may be properly combined in any one or more embodiments or implementations.

While embodiments of the disclosure are shown and described, those of ordinary skill in the art may understand that variations, changes, substitutions, and modifications may be made to these embodiments without departing from the principles and purposes of the disclosure, the scope of protection of the disclosure should be stated in the scope of protection of the claims and the equivalents.

What is claimed is:

1. An energy storage device, comprising:
- a case;
- a plurality of battery modules, wherein the plurality of battery modules are accommodated in the case;
- at least one cooling assembly, wherein the at least one cooling assembly is arranged between the plurality of battery modules; and
- at least one heat insulation support fixedly connected to the case, wherein the at least one heat insulation support each defines a fixing groove configured to fix one of the at least one cooling assembly;
- wherein the case comprises:
  - a baseboard, wherein the baseboard has a cross beam and a longitudinal beam perpendicular to the cross beam, the longitudinal beam is parallel to a length direction of the plurality of battery modules, and the cross beam is parallel to a width direction of the plurality of battery modules;
  - a side board, wherein the baseboard and the side board cooperatively form the case; and
  - wherein the at least one heat insulation support is arranged on the cross beam and the longitudinal beam;
- wherein each of the at least one heat insulation support comprises:
  - a fixing segment located at one side of the cross beam and fixed to the longitudinal beam, wherein the fixing groove is defined on top of the fixing segment;
  - a limiting segment located at another side of the cross beam; and
  - a connecting segment, wherein two ends of the connecting segment are connected to the fixing segment and the limiting segment respectively, and the connecting segment is supported by the cross beam;
- wherein the limiting segment comprises:
  - a main part located between the cross beam and the side board of the case, wherein two ends of the main part abut against the cross beam and the side board respectively, and the main part is perpendicular to the connecting segment;
  - a first reinforcing plate arranged on the main part, wherein the first reinforcing plate is connected to the connecting segment and coplanar with the connecting segment; and
  - two second reinforcing plates arranged on two sides of the first reinforcing plate respectively, wherein the two second reinforcing plates each are perpendicular to the first reinforcing plate, and the two reinforcing plates are arranged symmetrically with respect to the first reinforcing plate.

2. The energy storage device of claim 1, wherein the fixing segment has a positioning protrusion at bottom of the fixing segment, the longitudinal beam defines a positioning hole, and the positioning protrusion is inserted into the positioning hole.

3. The energy storage device of claim 1, wherein the fixing groove has openings on one side of the fixing groove away from the connecting segment and on top of the fixing groove, for insertion of the one of the at least one cooling assembly.

4. The energy storage device of claim 3, wherein the fixing groove has chamfers at the openings.

5. The energy storage device of claim 1, wherein groove walls of the fixing groove on two sides of the cooling assembly are equal in thickness.

6. The energy storage device of claim 1, wherein the at least one cooling assembly has at least one end in the length direction of the plurality of battery modules fixed in at least one fixing groove of the at least one heat insulation support.

7. The energy storage device of claim 6, wherein the energy storage device comprises a plurality of cooling assemblies, each of the plurality of cooling assemblies is arranged between two adjacent battery modules, the energy storage device comprises a plurality of heat insulation supports, each of the plurality of cooling assemblies is provided with one of the plurality of heat insulation supports on each of two ends of said each of the plurality of cooling assemblies in the length direction of the plurality of battery modules, and two ends of each of the plurality of cooling assemblies in the length direction of the battery modules are fixed in fixing grooves of heat insulation supports.

8. The energy storage device of claim 6, wherein the energy storage device comprises a plurality of cooling assemblies, a bus plate is arranged on the same end of the plurality of cooling assemblies in the length direction of the plurality of battery modules, and the plurality of cooling assemblies are connected to one another through the bus plate.

9. The energy storage device of claim 1, wherein the fixing segment, the connecting segment, and the limiting segment are integrally formed.

* * * * *